US008206680B2

(12) United States Patent
Diaz Chavez et al.

(10) Patent No.: US 8,206,680 B2
(45) Date of Patent: Jun. 26, 2012

(54) CALCO-MAGNESIAN AQUEOUS SUSPENSION AND METHOD FOR THE PRODUCTION THEREOF

(75) Inventors: Luis Alfredo Diaz Chavez, Beauvechain (BE); Timothy L. Salter, Forth Worth, TX (US); Ziad Habib, Brussels (BE); Henri-René Langelin, Caffiers (FR)

(73) Assignee: S.A. Lhoist Recherche et Developpement (BE)

( * ) Notice: Subject to any disclaimer, the term of this patent is extended or adjusted under 35 U.S.C. 154(b) by 429 days.

(21) Appl. No.: 10/565,715

(22) PCT Filed: Jul. 27, 2004

(86) PCT No.: PCT/EP2004/051609
§ 371 (c)(1),
(2), (4) Date: Jun. 12, 2006

(87) PCT Pub. No.: WO2005/014483
PCT Pub. Date: Feb. 17, 2005

(65) Prior Publication Data
US 2006/0275203 A1 Dec. 7, 2006

(30) Foreign Application Priority Data

Jul. 28, 2003 (BE) .................................. 2003/0426

(51) Int. Cl.
*C01F 11/02* (2006.01)
*C09K 3/00* (2006.01)
(52) U.S. Cl. ...................... 423/594.16; 516/88; 252/192
(58) Field of Classification Search ............. 423/594.16; 252/192; 516/88
See application file for complete search history.

(56) References Cited

U.S. PATENT DOCUMENTS

| 4,464,353 | A | 8/1984 | Hains et al. | 423/640 |
| 4,610,801 | A | 9/1986 | Matthews et al. | 252/181 |
| 4,849,128 | A | 7/1989 | Timmons et al. | 252/181 |
| 5,277,837 | A | 1/1994 | Dumont et al. | 252/190 |
| 5,422,092 | A | 6/1995 | Miyata | 423/635 |
| 5,616,283 | A * | 4/1997 | Huege et al. | 252/192 |

FOREIGN PATENT DOCUMENTS

| EP | 0 623 555 | 5/1994 |
| EP | 1 077 199 | 2/2001 |
| JP | 2-229712 | 9/1990 |
| JP | 10277384 A * | 10/1998 |
| JP | 10-291820 | 11/1998 |
| JP | 11-139850 | 5/1999 |

OTHER PUBLICATIONS

Machine translation of DE 4302539.*
"Improved Milk-of-Lime for Softening Drinking Water," by M.W.M vamn Eekeren, et al., Kiwa N.V. Research and Consultancy, copyright Sep. 1993.
"Slaking of Lime," by Johan B. Holmberg, Lund, Sweden, Feb. 5, 2001, pp. 6.

* cited by examiner

*Primary Examiner* — Emily Le
*Assistant Examiner* — Rebecca Lee
(74) *Attorney, Agent, or Firm* — Charles D. Gunter, Jr.

(57) ABSTRACT

Calco-magnesian aqueous suspension having particles of solid matter with, before being put into suspension, a specific surface area, calculated according to the BET method, which is less than or equal to $10 \, m^2/g$, and its method of preparation. Such an aqueous suspension of calco-magnesian solid matter can achieve a very low viscosity, making it possible to greatly increase the solid matter concentration of the suspension, or again to reduce the size of the particles in suspension, thus obtaining a concentrated and reactive milk of lime.

8 Claims, No Drawings

CALCO-MAGNESIAN AQUEOUS SUSPENSION AND METHOD FOR THE PRODUCTION THEREOF

The present invention relates to a calco-magnesian aqueous suspension or slurry and to its method of preparation.

A particular case of a calco-magnesian aqueous suspension is milk of lime, which is a fluid suspension of slaked lime, also referred to as hydrated lime (calcium hydroxide—$Ca(OH)_2$), which can obviously include impurities, in particular silica, alumina or magnesium oxide to the extent of a few percent. Such a suspension is obtained either by slaking quicklime (calcium oxide—$CaO$) with a large excess of water, or by mixing slaked lime and a mass of water several times greater. The resulting suspension is characterised by the concentration of solid matter and the distribution of the sizes of the particles in suspension. These two characteristics determine the properties of the slurry, mainly its viscosity and its reactivity.

Viscosity is a decisive property with regard to the use and handling (pumping, conveying in pipes etc) of the suspension. To this end, experience has made it possible to establish that it is desirable not to exceed a dynamic viscosity of 1.2 Pa·s. In general, the viscosity increases when the solid matter concentration increases and when the size of the particles in suspension decreases.

The reactivity of a milk of lime is a measure of the rate of dissolution of the particles when the milk is diluted in a large volume of demineralised water. This measure, based on the recording of the change in conductivity of the resulting liquid phase, has been developed for checking the reactivity of milks of lime intended for softening drinking water (see Van Eckeren et al. Improved milk-of-lime for softening of drinking water: the answer to the carry-over problem, in Aqua, 1994, 43(1), p. 1-10).

The reactivity of the milk of lime is also important for any neutralisation or flocculation operation.

It is known that the dissolution rate of the particles of lime is all the more rapid, the smaller the particle size. In addition, great fineness of the particles generally reduces the sedimentation of the solid phase of the suspension.

In general, it is economically advantageous to be able to increase the concentration of the milk of lime, in order to reduce the transportation costs and the size of the equipment (storage reservoirs, pumps etc).

The difficulty in reconciling low viscosity, high concentration and reduction in the size of the particles in suspension will be understood.

It is known how to improve the concentration of the milk of lime by adding a dispersing agent, in the presence of a small quantity of an alkaline metal hydroxide [U.S. Pat. Nos. 5,616, 283, 4,849,128, and 4,610, 801]. This method of preparation makes it possible to achieve concentrations of dry matter greater than 40%, with a dynamic viscosity below 1.2 Pa·s. However, the use of dispersing agent is expensive and incompatible with certain applications.

It is also known how to increase the solid phase concentration in the suspension, whilst limiting the increase in viscosity, by incorporating a slaked lime having a coarser particle size or by slaking quicklime under conditions favourable to the growth of the grains, for example by limiting the increase in temperature during slaking, by adding additives such as sulphates etc [BE-1006655, U.S. Pat. No. 4,464,353]. Such milks of lime are less reactive, which limits the uses thereof. Moreover, these suspensions sediment more rapidly, if no dispersing agent is added.

The aim of the present invention is to develop an aqueous suspension based on lime or a compound of lime with controlled viscosity, preferably low, in order to be able to increase its solid matter concentration and/or to reduce the size of the particles in suspension.

This problem is resolved, according to the invention, by a calco-magnesian aqueous suspension having particles of solid matter with, before putting in suspension, a specific surface area, calculated according to the BET method, which is less than or equal to 10 m²/g. Such a suspension can be prepared by putting into suspension a calco-magnesian solid matter having particles with a low specific surface area, less than or equal to 10 m²/g, according to the nitrogen adsorption measurement (BET method). It became clear, surprisingly, that an aqueous suspension of such a type of calco-magnesian solid matter could achieve a very low viscosity, and therefore as a corollary made it possible to greatly increase the solid matter concentration of the suspension, which was scarcely possible previously, or again to reduce the size of the particles in suspension, and therefore to obtain a concentrated and reactive milk. It has in fact been possible through the invention to show a direct relationship between the specific surface area of the particles in suspension and the viscosity of these suspensions, under identical conditions of concentration and particle size.

It should be noted that a hydrated lime having such a specific surface area has been known only for a short time. It can in particular be obtained by slaking quicklime in the presence of $CaCl_2$ (see Holmberg, J., Slaking of lime, document consulted on the Internet site http:// 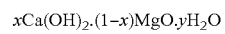server1.chemeng.lth.se/exjobb/009.pdf of June 2003) or a dispersing agent (see JP 11-139850).

According to a preferential embodiment of the invention, the particles of solid matter have a specific surface area according to the BET method of less than or equal to 8 m²/g, preferably less than or equal to 5 m²/g.

The suspension advantageously has a dynamic viscosity less than or equal to 1.2 Pa·s, preferably less than or equal to 1.0 Pa·s.

Under these conditions it is possible to obtain a suspension according to the invention having solid matter contents greater than 25%, and advantageously greater than 40%, and/ or $d_{98}$ granulometric dimensions of less than 20 microns, preferably equal to or less than 5 microns.

Advantageously the particles of solid matter of the calco-magnesian aqueous suspension according to the invention comply with the following formula:

$$xCa(OH)_2.(1-x)MgO.yH_2O$$

where
$0 < x \leq 1$, and
$y \leq (1-x)$,
x and y being molar fractions.

Preferably x has a value from 0.8 to 1, entirely advantageously of 1.

The particles of the suspension according to the invention can therefore be formed solely from hydrated lime, but also a mixed compound formed from hydrated lime and magnesia, which can be totally or partially hydrated, or even non-hydrated. This calco-magnesian material can obviously also contain impurities, as mentioned previously with regard to hydrated lime.

Other embodiments of the product and of the method according to the invention are indicated in the accompanying claims.

The invention will now be described in more detail by means of non-limiting examples.

EXAMPLE 1

Three concentrated milks of lime were prepared by mixing, at 20° C., 10 l of water and 5 kg of hydrated lime. One of these limes has a specific surface area of 20 m²/g and the other two, in accordance with the present invention, a specific surface area respectively of 10 and 5 m²/g. The specific surface area is measured by the adsorption of nitrogen, according to the BET method. The mixture is maintained under mechanical stirring for 30 minutes.

In order to obtain milks of lime with comparable granulometric distribution, these are sieved at 200 μm, the material passing through if necessary undergoes wet grinding, in a grinder with glass balls with a diameter of between 0.5 and 0.8 mm. The distribution of the particle sizes is measured by means of a laser granulometer; these distributions are characterised in terms of $d_{50}$, $d_{90}$ and $d_{98}$, interpolated values of the particle size distribution curve. The dimensions $d_{50}$, $d_{90}$ and $d_{98}$ correspond to the dimensions for which respectively 50%, 90% and 98% of the particles are less than the said dimensions.

The proportion of solid matter in the suspensions is adjusted by dilution, so as to obtain at the start of each hydrated lime 3 milks, containing respectively 20%, 25% and 30% solid matter. The viscosity of these milks of lime is measured by a "Brookfield DV III Rheometer" viscometer, with needle N° 3 at 100 rpm.

The specific surface area values of the 3 hydrated limes used for preparing milks of lime as well as the granulometric characteristics and viscosity of the corresponding suspensions are set out in Table 1.

TABLE 1

Specific surface area of the 3 hydrated limes used for preparing milks of lime as well as the granulometric characteristics and viscosities of the corresponding suspensions. The case of suspensions of particles having a $d_{98}$ of 17 to 18 μm.

| Milk | Specific surface area [m²/g] | Granulometric characterisation [μm] | | | Viscosity at various % of solids [Pa · s] | | |
|---|---|---|---|---|---|---|---|
| | | $d_{50}$ | $d_{90}$ | $d_{98}$ | 20% solid | 25% solid | 30% solid |
| 1 | 20 | 3 | 10 | 18 | 1.00 | >1.5 | >2 |
| 2 | 10 | 3 | 9 | 17 | 0.16 | 0.35 | 0.60 |
| 3 | 5 | 3 | 10 | 18 | 0.08 | 0.18 | 0.30 |

Predictably, it is found that, for a comparable granulometry and identical specific surface area, the viscosity increases as a function of the concentration. On the other hand, whatever the solid matter content, the viscosity decreases very greatly as a function of the specific surface area of the hydrated lime. In particular, when the solids concentration of the suspension is 20%, the viscosity decreases from 1 to 0.08 Pa·s when the specific surface area of the base hydrated lime decreases from 20 to 5 m²/g, for a comparable granulometry.

Moreover, when the specific surface area is 20 m²/g, the solid matter concentration must be below 25% in order to keep an acceptable viscosity (1.2 Pa·s). On the other hand, milks of lime with 30% solid matter and low viscosity (0.6 Pa·s) are easily obtained when the specific surface area of the hydrated lime is equal to or less than 10 m²/g, according to the present invention.

EXAMPLE 2

Three concentrated milks of lime are prepared according to the operating method presented in Example 1, one starting with a hydrated lime whose specific surface area was 15 m²/g, and two others according to the present invention starting with 2 hydrated limes whose specific surface area was respectively 10 and 5 m²/g. As in Example 1, the particles in suspension have comparable granulometries but finer. In Example 2, the dry matter concentration was also adjusted by dilution but so as to obtain 15%, 20% and 25% dry matter. The results were entered in Table 2.

TABLE 2

Specific surface area of the 3 hydrated limes used for preparing milks of lime as well as the granulometric characteristics and viscosities of the corresponding suspensions. The case of suspensions of particles having a $d_{98}$ of 5 μm.

| Milk | Specific surface area [m²/g] | Granulometric characterisation [μm] | | | Viscosity at various % of solids [Pa · s] | | |
|---|---|---|---|---|---|---|---|
| | | $d_{50}$ | $d_{90}$ | $d_{98}$ | 15% solid | 20% solid | 25% solid |
| 1 | 15 | 1.5 | 3 | 5 | 1.00 | >2 | — |
| 2 | 10 | 1.5 | 3.1 | 5 | 0.18 | 0.30 | 0.50 |
| 3 | 5 | 1.6 | 3 | 5 | 0.05 | 0.12 | 0.25 |

The results of Table 2 agree with those of Example 1: for the same solid content and comparable granulometry ($d_{98}$=5 μm), the viscosity of the milk of lime decreases when the specific surface area of the hydrated lime used decreases. Moreover, and as expected, it is clear from a comparison of Tables 1 and 2, for hydrated limes at 5 and 10 m²/g and with a solid matter content of 20% and 25%, that the viscosity of the milks of lime do indeed increase with the reduction in the size of the particles.

In this Example 2, it is found that obtaining a milk with a viscosity below 1.2 Pa·s with a solid matter content equal to or greater than 20% is possible starting with a hydrated lime of great fineness ($d_{98}$=5 μm) only if it has a specific surface area of less than or equal to 10 m²/g, according to the present invention.

EXAMPLE 3

Starting with the three concentrated milks of lime of Example 1, a dilution was carried out so as to adjust the viscosity to a value of between 1 and 1.2 Pa·s. The corresponding dry matter concentration was then determined. The results are presented in Table 3.

TABLE 3

Comparison of the solid contents for milks of lime having a viscosity of between 1 and 1.2 Pa · s. The case of a suspension having a $d_{98}$ of 17 to 18 microns.

| Milk | Specific surface area [m²/g] | Granulometric characterisation [μm] | | | Viscosity [Pa · s] | Solid content |
|---|---|---|---|---|---|---|
| | | $d_{50}$ | $d_{90}$ | $d_{98}$ | | |
| 1 | 20 | 3 | 10 | 18 | 1.00 | 20% |
| 2 | 10 | 3 | 9 | 17 | 1.00 | 32% |
| 3 | 5 | 3 | 10 | 18 | 1.10 | 40% |

For comparable particle size distribution and viscosity, the dry matter content is the higher, the smaller the specific surface area of the hydrated lime. Thus it is possible, without a dispersing agent, to double the dry matter content from 20% to 40%, if the specific surface area of the hydrated lime is reduced from 20 to 5 m²/g, according to the present invention.

EXAMPLE 4

In a similar manner to Example 3, the three concentrated milks of lime of Example 2 were diluted so as to adjust the viscosity to a value of between 1 and 1.2 Pa·s. The corresponding dry matter content was next determined. The results are presented in Table 4.

TABLE 4

Comparison of the solid contents for milks of lime having a viscosity of between 1 and 1.2 Pa · s. The case of a suspension having a $d_{98}$ of 5 microns.

| Milk | Specific surface area [m²/g] | Granulometric characterisation [µm] | | | Viscosity [Pa · s] | Solid content |
|---|---|---|---|---|---|---|
| | | $d_{50}$ | $d_{90}$ | $d_{98}$ | | |
| 1 | 15 | 1.5 | 3 | 5 | 1.00 | 15% |
| 2 | 10 | 1.5 | 3.1 | 5 | 1.00 | 28% |
| 3 | 5 | 1.6 | 3 | 5 | 1.20 | 35% |

The conclusions of Example 3 apply also to milks of lime of greater granulometric fineness ($d_{98}$=5 µm). The solid matter content, 15% for a slaked lime of 15 m²/g, reaches 35% for a hydrated lime of 5 m²/g, according to the present invention.

EXAMPLE 5

The object of this example is to validate the present invention with respect to a concentrated milk of lime, obtained industrially according to a known manufacturing method (the addition of a dispersing agent). The industrial milk of lime is prepared starting with a hydrated lime with a specific surface area of 20 m²/g and has a viscosity of 1.2 Pa·s. This suspension is compared with a milk of lime prepared according to the present invention with a hydrated lime with a specific surface area of 5 m²/g. The characteristics of the two milks of lime are presented in Table 5.

TABLE 5

Comparison of the characteristics of two milks with high solid matter content.

| Milk | Specific surface area [m²/g] | Granulometric characterisation [µm] | | | Viscosity [Pa · s] | Solid content |
|---|---|---|---|---|---|---|
| | | $d_{50}$ | $d_{90}$ | $d_{98}$ | | |
| industrial (+dispersing agent) | 20 | 12 | 80 | 150 | 1.20 | 45% |
| according to the invention | 5 | 4 | 50 | 130 | 1.20 | 45% |

It is therefore possible to obtain without a dispersing agent, according to the present invention, a milk of lime with the same viscosity (1.2 Pa·s) and the same solid matter content (45%) as an industrial milk with a very high concentration obtained by addition of dispersing agent. It should also be noted that the milk of lime according to the invention has greater fineness, for the same viscosity value. In addition, it contains no dispersing agent, which reduces its production cost and makes its use in a larger number of applications compatible.

EXAMPLE 6

Three milks of lime were prepared according to the operating method of Example 1, starting with a hydrated lime with a specific surface area of 5 m²/g but a distribution of different particle sizes and with a solid matter content of 34% to 45%. The viscosity of these milks of lime was measured, just after their preparation (initial viscosity) and after 7 days, during which they were kept under stirring. The characteristics of the three milks of lime are presented in Table 6.

TABLE 6

Stability over time of milks based on hydrated lime with low specific surface area.

| Milk | Specific surface area [m²/g] | Granulometric characterisation [µm] | | | Initial viscosity [Pa · s] | Viscosity after 7 days [Pa · s] | Solid content |
|---|---|---|---|---|---|---|---|
| | | $d_{50}$ | $d_{90}$ | $d_{98}$ | | | |
| 1 | 5 | 4 | 50 | 130 | 1.15 | 1.15 | 45% |
| 2 | 5 | 3 | 10 | 18 | 1.00 | 1.10 | 39% |
| 3 | 5 | 1.6 | 3 | 5 | 1.20 | 1.15 | 34% |

No significant change in the viscosity is observed in the interval of time in question. The milks of lime prepared according to the present invention can therefore be the subject of temporary storage before use, without prejudice to their ease of use.

EXAMPLE 7

Three milks of lime were prepared according to the operating method of Example 1, starting with a hydrated lime with a specific surface area of 5, 10 and 15 m²/g so as to obtain milks of lime which were very fine, and therefore deemed to be highly reactive.

The reactivity was determined by measuring the dissolution rate of a known quantity of grains of lime in suspension, under very dilute conditions. More precisely, it was a case of measuring the time "$t_{90}$" necessary for reaching a conductivity value, corresponding to 90% of the maximum conductivity, corresponding to the dissolution equilibrium value.

The test is carried out as follows: 5 cm³ of milk of lime, diluted to 2% dry matter, are added instantaneously to 700 cm³ of demineralised water, thermostatically controlled at 25° C. and kept under stirring at 400 rpm. The change in conductivity is measured every 0.3 seconds, until a stable conductivity value is obtained. The $t_{90}$ value is interpolated from the recording of the conductivity curve.

The milks of lime of low reactivity have a $t_{90}$ value of several tens of seconds; on the other hand, a milk of lime can be considered to be highly reactive when its $t_{90}$ is less than 3 seconds.

The results of the reactivity tests, applied to the three milks of lime, described above, appear in Table 7.

TABLE 7

Results of the reactivity test as a function of the specific surface area of the hydrated lime. The case of a lime of great fineness ($d_{98}$ = 5 μm).

| Milk | Specific surface area [$m^2$/g] | Granulometric characterisation [μm] | | | $t_{90}$ [s] |
|---|---|---|---|---|---|
| | | $d_{50}$ | $d_{90}$ | $d_{98}$ | |
| 1 | 15 | 1.5 | 3 | 5 | 2.1 |
| 2 | 10 | 1.5 | 3.1 | 5 | 2.2 |
| 3 | 5 | 1.6 | 3 | 5 | 2.3 |

It should be noted that the value of the reactivity ($t_{90}$) is independent of the specific surface area of the hydrated lime used for preparing the milk.

It must be understood that the present invention is in no way limited to the embodiments described above and that many modifications can be made thereto without departing from the scope of the accompanying claims.

The invention claimed is:

1. Calco-magnesian aqueous suspension having particles of solid matter with a solid matter content greater than or equal to 32% by weight wherein said particles of solid matter present, before being put into suspension, a specific surface area, calculated according to the BET method, taking into account internal specific surface area, which is less than or equal to 10 $m^2$/g, and a $d_{98}$ granulometric dimension of less than 20 microns, where the distribution of the particle size is measured by means of a laser granulometer and the distribution is characterized in terms of $d_{98}$ interpolated value of the particles size distribution curve, the dimension $d_{98}$ corresponding to the dimension for which 98% of the particles are less than the said dimension, said suspension having a dynamic viscosity less than or equal to 1.2 Pa·s.

2. Suspension according to claim 1, in which the said particles of solid matter have a specific surface area calculated according to the BET method which is less than or equal to 8 $m^2$/g.

3. Suspension according to claim 1, in which the said particles of solid matter have a specific surface area calculated according to the BET method which is less than or equal to 5 $m^2$/g.

4. Suspension according to claim 1, in which the particles of solid matter comply with the formula:

$$x\text{Ca(OH)}_2.(1-x)\text{MgO}.y\text{H}_2\text{O}$$

where

0<x<1, and y≦(1−x), x and y being molar fractions.

5. Suspension according to claim 1, having a dynamic viscosity less than or equal to 1.0 Pa·s.

6. Suspension according to claim 1, characterised in that it has a solid matter content greater than 40% by weight.

7. Suspension according to claim 1, wherein the said particles of solid matter have a $d_{98}$ granulometric dimension equal or less than 5 microns.

8. Method of preparing the calco-magnesium aqueous suspension according to claim 1, comprising putting a calco-magnesium solid matter into suspension in an aqueous medium.

* * * * *